United States Patent [19]

Sommer et al.

[11] Patent Number: 5,693,451
[45] Date of Patent: Dec. 2, 1997

[54] RECORDING MATERIAL FOR IMAGES OR DATA

[75] Inventors: Alexa Sommer, Pittsburgh, Pa.; Udo Herrmann, Dormagen, Germany; Robert Bloodworth, Köln, Germany; Günther Penners, Leverkusen, Germany; Klaus Sommer, Pittsburgh, Pa.

[73] Assignee: Bayer Aktiengesellschaft, Leverkusen, Germany

[21] Appl. No.: 311,697

[22] Filed: Sep. 23, 1994

[30] Foreign Application Priority Data

Sep. 27, 1993 [DE] Germany .................. 43 32 795.8

[51] Int. Cl.$^6$ .................................................. G03C 1/73
[52] U.S. Cl. ............... 430/270.1; 430/945; 430/913; 430/905; 430/273.1; 430/176; 430/170; 430/179
[58] Field of Search ................. 430/270, 276, 430/273, 179, 177, 171, 196, 170, 164, 913, 905, 945, 270.1, 276.1, 273.1

[56] References Cited

U.S. PATENT DOCUMENTS

| | | | |
|---|---|---|---|
| 4,529,688 | 7/1985 | Law et al. | 430/945 |
| 4,873,178 | 10/1989 | Haruta et al. | 430/292 |
| 4,975,317 | 12/1990 | Kuhn et al. | 428/253 |
| 4,985,332 | 1/1991 | Anderson et al. | 430/176 |
| 5,098,804 | 3/1992 | Booth | 430/327 |
| 5,395,715 | 3/1995 | Ueda et al. | 430/79 |

FOREIGN PATENT DOCUMENTS

| | | |
|---|---|---|
| 240786 | 11/1986 | Germany . |
| 60-78442 | 5/1985 | Japan . |
| 196652 | 8/1987 | Japan . |
| 1-51426 | 2/1989 | Japan . |
| 1-123228 | 5/1989 | Japan . |
| 5-333435 | 12/1993 | Japan . |
| 702614 | 1/1954 | United Kingdom . |
| 905699 | 9/1962 | United Kingdom . |
| 1074913 | 7/1967 | United Kingdom . |
| 1423991 | 2/1976 | United Kingdom . |

OTHER PUBLICATIONS

JP 61144391 (1 page).
Derwent Abstract, p. 6, Week 9310, 1 page; JP05024339–A, "Recording material with colour development properties . . . ", Mitsui Petrochem Ind, Jul. 17, 1991.
Chemical Abstracts, vol. 106, 1987, p. 652; CA# 129447n: "Method for image formation", M. Haruta et al., JP 61169870.
Chemical Abstracts, 1 page; CA# 123957b: "Optical recording medium", T. Komori, JP 0253235, Feb. 2, 1990; vol. 113.
Chemical Abstracts, vol. 112, 1990, 1 page; CA# 169190d: "Optical recording media having a photo–and electrochromic . . . ", Y. Sato et al, JP 01227147.
Chemical Abstracts, vol. 111, 1989, p. 780; CA# 244459h: "Optical information recording medium", N. Ogata et al, JP 01166989.
English Abstract of JP 62–196,652, vol. 12, No. 48, (Feb. 1988).
Derwent Abstract of JP 62–196,652, Aug. 1987.

*Primary Examiner*—Martin Angebrannt
*Attorney, Agent, or Firm*—Sprung Horn Kramer & Woods

[57] ABSTRACT

The present invention relates to a single or multi-layer recording material for recording images or data, which material has at least one layer sensitive to light or to heat of a plastic containing a pyrrole compound or a pyrrole oligomer.

17 Claims, 2 Drawing Sheets

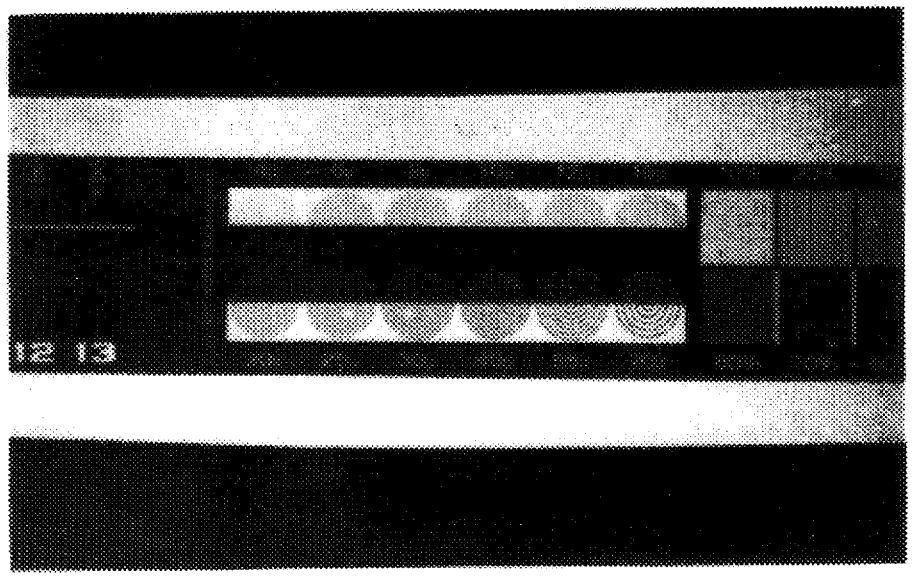
FIG. 1
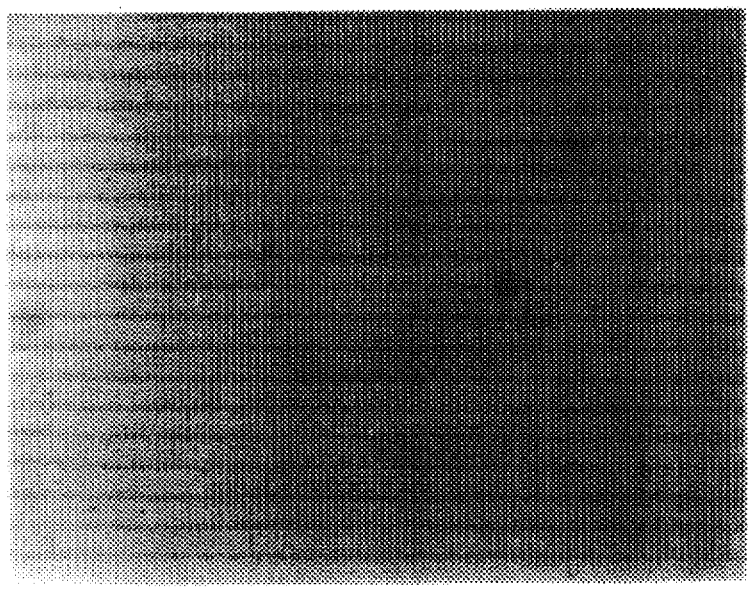
FIG. 2   1 : 100

RECORDING MATERIAL FOR IMAGES OR DATA

The present invention relates to a single or multi-layer recording material for recording images or data, which material has at least one layer sensitive to light or to heat prepared from plastic containing a pyrrole compound or a pyrrole oligomer.

A recording material comprising an electrically conductive support, a polypyrrole layer polymerised thereon and a further heat-sensitive polymer layer containing free acid groups is known from Japanese published patent application JP 61 169 870. The material, which is black in colour before exposure/development, must be developed in a wet chemical process after being exposed with heat.

JP 02 053 235 A2 describes a polymer film which may be bleached by irradiation to form an image.

JP 01 227 147 A2 describes a brown coloured, optical recording medium consisting of an electrically conductive base layer and an electropolymerised, photosensitive layer, which contains, for example, polypyrrole together with certain photosensitive spiro compounds. On irradiation with light, the medium merely reversibly changes its colour from brown to red.

JP 01 166 989 A2 also describes a recording medium which contains, in addition to polypyrrole bis[(1,2-dithia)-1,2-ethylenedithiolato]nickel. The dark film reacts to wavelengths of between 750 to 950 nm by bleaching.

Further similar recording materials based on bleaching dark films containing polypyrrole are mentioned in the documents U.S. Pat. No. 4,873,178, U.S. Pat. No. 4,711,830 and JP 61 144 391.

In all known pyrrole-based recording media, the process is based upon bleaching or discolouring dark polypyrrole layers. These recording media are developed, if they may be developed at all, using Wet chemical processes.

The structure of all these recording materials based on polypyrrole films also demands an electrically conductive substrate or a conductive support onto which the polypyrrole layer is polymerised.

The object of the invention is to provide a recording material for images or data which operates without the stated disadvantages, which in particular requires no wet chemical development stages, in which the recording of images or data is associated with an increase in the optical density of the written areas and in which writing with light of differing wavelengths is possible over a broad range of the spectrum.

The object is achieved according to the invention by a single or multi-layer recording material which contains at least one recording layer constituted by plastic containing a pyrrole compound or a pyrrole oligomer, optionally together with an acid donor in the recording layer and/or in another optional layer located above or below the recording layer.

The present invention provides a recording material for recording images or data, which material has at least one layer sensitive to light or to heat prepared from a plastic as support and optionally further layers, characterised in that the recording layer contains (A) from 1 to 25 wt. %, preferably from 5 to 15 wt. %, of a pyrrole compound and/or pyrrole oligomer, (B) optionally from 1 to 30 wt. %, preferably from 5 to 25 wt. %, of an acid donor, (C) optionally from 1 to 25 wt. %, preferably from 1 to 15 wt. % of initiators, (D) optionally from 1 to 25 wt. %, preferably from 1 to 15 wt. %, of oxidants and (E) up to 99 wt. %, preferably up to 95 wt. %, of a polymer as a plastic support material.

Essential constituents of the recording material are the pyrrole compound and/or the pyrrole oligomer and the acid donor. Writing of the image or of any other information is initiated by the action of light or heat. Writing brings about an increase in the optical density of the recording layer due to the formation of pyrrole polymers. This process is accelerated by the acid optionally liberated by the acid donor.

Suitable pyrrole compounds (A) for the recording material according to the invention are, for example, pyrrole and substituted pyrrole, in particular N-alkylpyrrole, N-arylpyrrole, pyrroles which are monoalkyl- to trialkyl-substituted on the pyrrole carbon atoms, together with halogen-substituted, in particular mono- or dihalogen-substituted pyrroles. In all cases, the preferred alkyl substitution is by $C_1$–$C_4$ alkyl substituents. In all cases of disubstitution, substitution on the 3,4-position of the pyrrole is particularly preferred. Fused pyrroles, such as for example indoles or carbazoles, are also suitable, as are porphyrins such as, for example, the condensation product of cyclohexanone and pyrrole containing four pyrrole units (21,22,23,24-tetrazaquaterene-2,7,12,17-tetraspirocyclohexane). The stated pyrrole compounds may be present in the recording layer alone or in any desired mixtures.

In addition to the pyrrole compound, small quantities of other heterocyclic compounds, such as furan, thiophene or thiazole, may also be present in the recording layer.

Suitable pyrrole oligomers are any colourless oligomers of the stated pyrrole compounds.

Acid donors (B) pursuant to the invention are any relatively strong organic acids or compounds which release strong organic acids. In particular, alkylarylsulphonic acids, aliphatic sulphonic acids, preferably $C_1$–$C_{16}$-alkylphenyl or $C_1$–$C_{16}$-alkylnaphthylsulphonic acid, particularly preferably toluenesulphonic acid, together with acidic phosphoric acid esters, such as for example mono- and dialkylphosphoric acid esters, in particular diethylhexylphosphoric acid ester. Preferred acid donors are in particular esters of the stated strong acids, for example o-nitrobenzyl esters of these acids. The acid donor may be a constituent of the recording layer or at least one further optional layer located above or below the recording layer from which the acid passes into the recording layer. In order to improve the storage stability of the recording material, the acid donor or the pyrrole may be present in encapsulated form, for example as so-called microcapsules. A preferred recording material is one in which the pyrrole component (A) and acid donor (B) are both located in the recording layer.

The recording layer contains a preferably transparent polymer as the plastic support material. Suitable polymers (E) are those having good solubility for the image-forming constituents, in particular for the pyrrole compound or the pyrrole oligomers. Preferred polymers (E) pursuant to the invention are polycarbonate, cellulose acetate, dimethylpolyphenylene oxide, polyvinyl butyral, polyacrylic acid esters, polyurethane and polyurethaneurea, preferably polycarbonate, cellulose acetate and dimethylpolyphenylene oxide.

In addition to the recording layer, the recording material may also have an additional base layer or support to improve its mechanical properties (tear strength, mechanical stability). Suitable support materials are, for example, semi-synthetic or synthetic polymers, such as cellulose nitrate, cellulose acetate, cellulose butyrate, polystyrene, polyvinyl chloride, polyethylene terephthalate (PET) and polycarbonate. Photoreflective materials, such as for example aluminium, or opaque material, such as for example paper laminated with a barytes or α-olefin polymer layer are also suitable.

The stated support materials may be present as film, sheeting or also thicker sheet. The support may be coloured with dyes or pigments (for example titanium dioxide), for example black to shield the underside of the recording material from light.

The recording material may be present and be produced in various forms, for example as film, sheeting or sheet. Films or sheeting of the recording material are produced in a per se known manner by casting (for example in cascade casting machines) or by extrusion. Sheets of the recording material may, for example, be produced in a similar manner to optical storage disks (CD-ROM, WORM), by injection moulding or by using spin coating techniques (for example when applying the recording layer).

In addition to the recording layer and optionally the support, the recording material may also have further layers. It is, for example, possible to apply an outer layer which protects the recording layer from mechanical damage (scratches) or chemical ageing.

Any transparent polymers, for example those transparent, semi-synthetic or synthetic polymers stated to be suitable support materials for the recording layer or the optional additional base layer, are suitable materials for an outer layer. Polyvinyl alcohol is, for example, suitable as an oxygen barrier layer to prevent ageing. The outer layer may moreover consist of a polymer with an elevated glass transition temperature in order, for example in the case of exposure or development of the recording material with heat, to avoid contamination of the development/exposure device with soft material from the recording layer or other layers.

Further additives may also be added to the recording material, in particular to the recording layer or to a layer associated with the recording layer. According to the invention, additives are, for example, photosensitisers which increase the sensitivity of the recording layer to light. Further suitable additives include customary and moulding and processing auxiliaries, such as lubricants or spreading agents (for example surfactants), plasticisers, mould release agents etc.. The additives are incorporated into the recording layer in quantities of 1 to 25 wt. %. Benzophenones may in particular be cited here as photosensitisers.

Suitable initiators (C) pursuant to the invention are photo- or thermoinitiators which either directly accelerate polymerisation of the pyrrole component or indirectly accelerate polymerisation by speeding up the release of the acid from the acid donor. Suitable initiators are, in particular, benzilketals, metallocenes, α-hydroxyketones, α-aminoketones, esters of 2-nitrobenzyl alcohol and 2-nitrobenzaldehyde and mixtures thereof. Benzilketal is particularly preferred.

In order to improve storage stability and to retain the sensitivity of the recording material, 1 to 5 wt. % of antioxidants may be added to the recording layer, in order, for example, to inhibit discolouration by atmospheric oxygen. Suitable antioxidants are, for example, substituted tetramethylpiperidines.

The oxidants (D) optionally added to the recording layer are, for example, substituted quinones, such as for example tetrachlorobenzoquinone or phenylbenzylquinone. They also serve to accelerate polymerisation of the pyrrole component, such that the colour of the polypyrrole formed, for example under the action of light or heat, is further deepened, or complete blackening may be achieved (for example with tetrachlorobenzoquinone).

Another preferred recording material contains dyes in addition to the stated components, which dyes absorb light of a specific wavelength, for example infra-red absorbing dyes. Adding such dyes in quantities of 0.1 to 5 wt. %, related to the recording layer, further increases the sensitivity of the recording material to writing with laser light in the visible or infra-red range of the spectrum.

Another preferred variant of the recording material according to the invention contains an additional interlayer in the vicinity of the recording layer prepared from a polymer, for example a polymer (E), containing uncapped, acid-binding compounds as fixing agents, for example long chain, aliphatic, preferably $C_8$–$C_{16}$ alkyl acid amides. These may release acid-binding compounds (for example amines) in a controlled manner, for example, by exposure to light, heating or application of an external electrical current. The recording material maybe fixed by the migration of these compounds from the interlayer into the recording layer and the subsequent neutralisation of the acid in the acid donor by these compounds.

The fixing agent is preferably added to the interlayer in a quantity of 1 to 30 wt. %.

In one variant of the preferred recording material, the fixing agent, which is present in capped form in the interlayer or in particular in an amount of 1 to 20 wt. % in the recording layer, related to this layer, is initially released on exposure instead of the acid. The latent image so produced is then developed by the acid being released in a second stage by a second uniform, overall exposure of a different nature (for example with light of a different wavelength) or by heat treatment.

In contrast with the usual process, no darkening of the recording material occurs in the initially exposed areas, since the acid released there is at least partially neutralised. The stated areas remain light in colour, while darkening occurs in the areas not initially exposed.

The recording material according to the invention is also suitable for demanding graphics applications since it has high light/dark contrast and elevated resolution. In its unexposed initial state, the recording material, in particular in the recording layer, preferably has a low optical density of $\leq 0.1$ in the visible range of the spectrum and an optical density of up to <0.25 in the range (at a wavelength of <400 nm).

Exposed and developed areas of the recording material have an optical density of up to >3.0 in the visible range of the spectrum and up to 3.5 in the UV range, related to a recording layer of 20 μm in thickness. A preferred recording material thus has a possible difference in optical density of the recording layer between the fully exposed and unexposed state of at least 2.0, in particular 3.0.

The optical density of the recording material may preferably be increased by up to 3.16 and more in the visible range of the spectrum by heating, for example by developing the recording material in an oil bath at 180° C. for 6 seconds. Writing with a laser, for example at a power density of 633 kW/cm$^2$ and a writing speed of 0.7 m/min, achieves an increase in optical density of >1.9.

The recording material is moreover suitable for recording images with detailed grey scales, for example in scientific or medical photography, and for data storage, for example on optical storage disks similar to CD-ROM or WORM. It is conceivable that, in addition to the material's good resolution, storage density may be increased when using the recording material as an optical storage medium by additional coding using defined grey levels. The recording material may be used as a black and white or X-ray film material, for example as a negative or positive film, or also as photographic paper.

The invention is illustrated in greater detail by the following examples and figures.

FIG. 1 is a reproduction of a test pattern which was written on a film containing pyrrole according to the invention (according to example 2). The figure is shown at a magnification of approximately 2.

FIG. 2 shows lines 10 μm in width written on a recording material according to the invention at approximately 100 times magnification.

Figure 3:
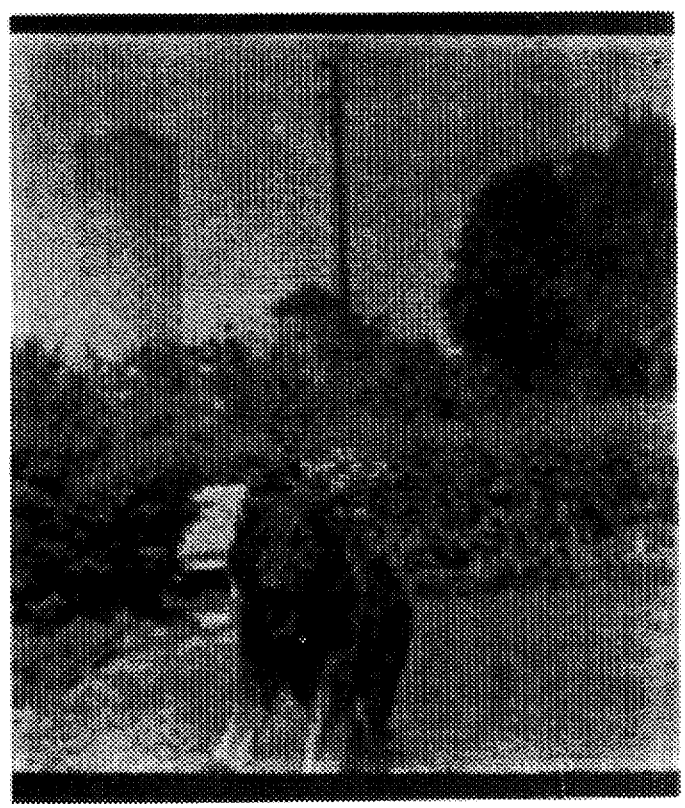
FIG. 3 is an outdoor photograph taken on a film according to production example 2.

The recording material may be present in any desired thickness with one or more recording layers, which may optionally have differing sensitivities for various wavelengths under the action of light. In the case of films or sheeting, the thickness of the recording layer is preferably 1 to 100 μm, particularly preferably 1 to 20 μm. The optionally present interlayers are preferably 1 to 10 μm in thickness. The optionally present outer layer is preferably 1 to 10 μm thick.

EXAMPLE 1

A 10 wt. % solution of acetyl cellulose with 0.7 wt. % pyrrole and 0.7 wt. % toluenesulphonic acid in acetone is applied to a substrate with a coating knife and dried for 15 minutes at 50° C. After drying, the thickness of the film is approximately 20 μm. The resultant film darkens in colour in those areas which are particularly irradiated or heated (for example heated with a hot stamp).

EXAMPLE 2

A polymer matrix prepared from 45 g of polyphenylene oxide and 5 g of polycarbonate is applied as a 10% chloroform solution with a coating knife to a transparent polyethylene terephthalate support film (thickness 100 μm). The solution additionally contains 0.75 g of pyrrole, 1.25 g of p-toluenesulphonic acid o-nitrobenzyl ester as acid donor and 0.1 g of Irgacure® 651 (2,2-dimethoxy-1,2-diphenylethan-1-one) as photo- and thermoinitiator. Before drying, the thickness of the resultant recording layer is approximately 200 μm. The entire film is dried for 15 minutes at 50° C. in a drying cabinet. After drying, the thickness of the recording layer is 20 μm. The optical density of the recording layer may be increased from 0.1 to over 3.0 in the visible range of the spectrum by exposure and heating.

EXAMPLE 3

The film obtained according to example 2 is provided with an additional PVAL outer layer by being immersed in a 10 wt. % aqueous solution of polyvinyl alcohol (PVAL from completely saponified PVA). After subsequent drying, an outer coat of PVAL of approximately 2 μm in thickness remains. The recording layer protected in this manner exhibits substantially constant sensitivity over a period of several days. The optical density of the unexpired recording layer also remains approximately constant over this period of storage.

EXAMPLE 4

0.2 g of p-nitrobenzoic acid o-nitrobenzyl ester, 0.2 g of pyrrole and 0.1 g of Irgacure® 651 (2,2-dimethoxy-1,2-diphenylethan-1-one) are dissolved in 10 g of a (10 wt. %) polycarbonate solution in chloroform. A 200 μm thick layer of the solution is applied with a coating knife onto a PET film of 100 μm in thickness. The film is dried at 50° C. for 15 minutes. After drying, the thickness of the recording layer is approximately 20 μm. The optical density of the recording layer may be increased from 0.1 to 1.5 in the visible range of the spectrum by exposure to light. The exposed areas of the film are brown in colour.

EXAMPLE 5

0.2 g of 2-nitrobenzoic acid, 0.2 g of pyrrole and 0.2 g of Irgacure® 651 are dissolved in 10 g of a (10 wt. %) polycarbonate solution in chloroform. A 200 μm thick layer is applied with a coating knife onto a PET film of 100 μm in thickness. After 15 minutes' drying at 50° C., the thickness of the recording layer is approximately 20 μm. The optical density of the recording layer may be increased from 0.1 to 2 in the visible range of the spectrum by exposure to light. The exposed areas of the film are black in colour.

EXAMPLE 6

0.2 g of 2-nitrobenzaldehyde, 0.3 g of pyrrole and 0.2 g of Irgacure® 261 [=(n-2,4-cyclopentadien-1-yl)[(1,2,3,4,5,6-n)-(1-methylethylbenzene]-iron 1+) hexafluorophosphate] are dissolved in 10 g of a (10 wt. %) polycarbonate solution in chloroform. A 200 μm thick layer is applied with a coating knife onto a PET film of 100 μm in thickness. After 15 minutes' drying at 50° C., the thickness of the recording layer is approximately 20 μm. The optical density of the recording layer may be increased from 0.2 to over 2 in the visible range of the spectrum by exposure to light. The exposed areas of the film are dark brown in colour.

EXAMPLE 7

A recording material according to example 3 is produced which additionally contains in the recording layer 0.1 g of stearic acid diethanolamide as acid binder (fixing agent), related to 5.0 g of film solution. The recording film modified in this manner exhibits distinctly reduced darkening on moderately long storage (60 hours' storage at a temperature of 50° C.).

EXAMPLE 8

The film solutions for the production of a recording layer described in examples 1 to 7 are applied to paper with a coating knife. The recording paper obtained in this manner may be written with light (for example laser light or exposure in a UV contact exposure device). Images similar to those obtained from black and white photography with silver halides and of comparable image quality are obtained.

FIG. 2, for example, shows 10 μm line structures magnified by approximately 100 times, which were produced on such recording paper with a focused laser bream (neodymium YAG laser, power 350 mW). In this case, the composition of the recording layer is as in the layer from example 2.

EXAMPLE 9

(Heat-sensitive Film)

0.2 g of p-toluenesulphonic acid o-nitrobenzyl ester, 0.2 g of Irgacure® 261 and 0.2 g of porphyrin (condensation product prepared from cyclohexanone and pyrrole) are dissolved in 10 g of a (10 wt. %) polycarbonate solution in chloroform. A 200 μm thick layer of this solution is applied to PET film with a coating knife and dried for 15 minutes at 50°. The following optical densities are measured using an X-Write densitometer (from X-Write, Michigan USA):

| Heating time at 100° C. | Optical density of recording layer |
|---|---|
| 0 minutes | 0.1 |
| 15 minutes | 0.93 |
| 30 minutes | 1.67 |
| 60 minutes | 2.59 |

EXAMPLE 10

(Heat-sensitive Film)

0.15 g of 2-nitrobenzoic acid, 0.2 g of porphyrin (condensation product prepared from cyclohexanone and pyrrole) and 0.1 g of Irgacure® 261 are dissolved in 10 g of a (10 wt. %) polycarbonate solution in chloroform. A 200 μm thick layer of the solution is applied with a coating knife to a 100 μm PET film. After 15 minutes' drying at 50° C., the resultant film is heated to 100° C. for 30 minutes.

The optical density of the recording layer is 0.9 after heating and 0.05 before heating.

We claim:

1. Recording material for recording images or data, which material has
   (I) at least one recording layer, sensitive to light or to heat prepared from a plastic as support and characterized in that the recording layer contains
      (A) from 1 to 25 wt % of a pyrrole compound and/or pyrrole oligomer, selected from pyrrole and pyrroles which are monoalkyl- to trialkyl-substituted on the pyrrole carbon atoms,
      (B) from 1 to 30 wt. % of an acid donor,
      (C) optionally up to 25 wt. % of initiators,
      (D) optionally up to 25 wt. % of oxidants and
      (E) up to 98 wt. % of a polymer as a plastic support material, and
   (II) at least one interlayer comprising at least one support material and from 1 to 30 wt. %, related to the interlayer, of an uncapped, acid-binding compound as fixing agent.

2. Recording material according to claim 1, characterised in that the recording layer contains
   (A) from 5 to 15 wt. % of a pyrrole compound and/or pyrrole oligomer and
   (E) up to 95 wt. % of a polymer as a plastic support material.

3. Recording material according to claim 1, characterised in that the recording layer contains
   (B) from 5 to 25 wt. % of an acid donor,
   (C) from 1 to 15 wt. % of initiators and
   (D) from 1 to 15 wt. % of oxidants.

4. Recording material according to claim 1, characterised in that the pyrrole compound A) contained in the recording layer is an unsubstituted pyrrole.

5. Recording material according to claim 1, characterised in that the polymer E) contained in the recording layers is polycarbonate, cellulose acetate, dimethylpolyphenylene oxide, polyvinyl butyral, polyacrylic acid esters, polyurethane or polyurethaneurea.

6. Recording material according to claim 1, characterised in that benzophenones are contained as additional additives in the recording layer.

7. Recording material according to claim 1, characterised in that 1 to 5 wt. % of antioxidants are additionally contained in the recording layer.

8. Recording material according to claim 1, characterised in that, apart from the recording layer, the recording material has at least one outer layer to protect the recording layer from mechanical damage or atmospheric oxygen.

9. Recording material according to claim 1, characterized in that the recording material has in the recording layer in the unexposed area an optical density of $\leq 0.1$ in the visible range of the spectrum and an optical density or, 0.25 in the UV range at <400 nm.

10. Recording material according to claim 1, characterised in that the recording material has a difference in optical density of the recording layer between the fully exposed and unexposed state of at least 2.0.

11. Use of the recording material according to claim 1 as an optical storage medium to record data.

12. Recording material to claim 1, characterized in that the acid donor B) contained in the recording layer comprises alkylarylsulphonic acids, aliphatic sulphonic acids or acidic phosphoric acid esters.

13. Recording material according to claim 1, wherein the pyrrole compound or pyrrole oligomer (A) is a porphyrin.

14. Recording material for recording images or data, which material has at least one layer, which is a recording layer, sensitive to heat prepared from a plastic as support and optionally further layers, characterized in that the recording layer contains
   (A) from 1 to 25% of a porphyrin,
   (B) from 5 to 25 wt. % of an acid donor, comprising alkylarylsulphonic acids, aliphatic sulphonic acids or acidic phosphoric acid esters,
   (C) from 1 to 15 wt. % of initiators and
   (D) from 1 to 15 wt. % of oxidants.

15. Recording material according to claim 14, characterised in that the polymer E) contained in the recording layers is polycarbonate, cellulose acetate, dimethylpolyphenylene oxide, polyvinyl butyral, a polyacrylic acid ester, polyurethane or polyurethaneurea.

16. Recording material according to claim 14, characterised in that a benzophenone is contained as an additional additive in the recording layer.

17. Recording material according to claim 14, characterised in that the recording material has a difference in optical density of the recording layer between the fully exposed and unexposed state of at least 2.0.

* * * * *